(12) United States Patent
Shibata et al.

(10) Patent No.: US 6,629,716 B2
(45) Date of Patent: Oct. 7, 2003

(54) STRUCTURE FOR HOLDING FUNCTIONAL DEVICE

(75) Inventors: Minoru Shibata, Aichi-ken (JP); Katsuhiro Katagiri, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/180,118

(22) Filed: Jun. 27, 2002

(65) Prior Publication Data

US 2003/0001406 A1 Jan. 2, 2003

(30) Foreign Application Priority Data

Jun. 27, 2001 (JP) ........................................ 2001-194547

(51) Int. Cl.$^7$ .............................................. B62D 25/14
(52) U.S. Cl. ...................... 296/70; 296/37.7; 296/37.8
(58) Field of Search ........................ 296/70, 24.1, 37.1, 296/37.8, 37.7, 37.9, 37.11, 37.12, 97.7; 361/608; 348/837; 340/815.4; 224/282

(56) References Cited

U.S. PATENT DOCUMENTS

| | | | | |
|---|---|---|---|---|
| 4,105,246 A | * | 8/1978 | Trumbull | 296/97.7 |
| 4,241,870 A | * | 12/1980 | Marcus | 296/37.7 |
| 4,469,365 A | * | 9/1984 | Marcus et al. | 296/37.7 |
| 4,712,823 A | * | 12/1987 | Mills et al. | 296/37.8 |
| 4,733,900 A | * | 3/1988 | Fluharty | 296/37.8 |
| 4,860,161 A | * | 8/1989 | Maki et al. | 361/608 |
| 4,867,498 A | * | 9/1989 | Delphia et al. | 296/37.7 |
| 5,020,845 A | * | 6/1991 | Falcoff et al. | 296/37.7 |
| 5,050,922 A | * | 9/1991 | Falcoff | 296/37.7 |
| 5,190,314 A | * | 3/1993 | Takasugi | 296/37.12 |
| 5,199,449 A | * | 4/1993 | Dabringhaus et al. | 296/37.12 |
| 5,385,378 A | * | 1/1995 | Hakamada et al. | 296/37.12 |
| 5,533,772 A | * | 7/1996 | Volkers et al. | 296/37.9 |
| 5,558,385 A | * | 9/1996 | Gross et al. | 296/37.12 |
| 5,645,340 A | * | 7/1997 | Colton | 296/37.9 |
| 5,775,761 A | * | 7/1998 | Asami et al. | 296/37.7 |
| 5,822,023 A | * | 10/1998 | Suman et al. | 348/837 |
| 5,904,389 A | * | 5/1999 | Vaishnav et al. | 296/37.12 |
| 6,003,925 A | * | 12/1999 | Litke et al. | 296/37.8 |
| 6,049,288 A | * | 4/2000 | Kawasaki | 340/815.4 |
| 6,062,623 A | * | 5/2000 | Lemmen | 296/37.8 |
| 6,085,953 A | * | 7/2000 | Bober et al. | 224/282 |
| 6,125,030 A | * | 9/2000 | Mola et al. | 296/37.8 |
| 6,126,221 A | * | 10/2000 | Kern | 296/37.7 |
| 6,176,534 B1 | * | 1/2001 | Duncan | 296/70 |
| 6,354,649 B1 | * | 3/2002 | Lee | 296/70 |

FOREIGN PATENT DOCUMENTS

JP  11-312428  11/1999

* cited by examiner

Primary Examiner—Kiran Patel
(74) Attorney, Agent, or Firm—Posz & Bethards, PLC

(57) ABSTRACT

A structure for holding switches in a passenger compartment of a vehicle. The structure includes a switchboard arranged on a panel in the passenger compartment. The switches are mounted on the switchboard. An accommodating case is arranged adjacent to the switchboard. A common shaft, which is shared by the switchboard and the accommodating case, pivotally supports the switchboard and the accommodating case. The switchboard and the accommodating case are each pivoted about the common shaft between a retracted position and an operational position. The switchboard and the accommodating case are each accommodated in the panel when located at the retracted position and exposed from the panel when located at the operational position. The switchboard remains at the retracted position when the accommodating case is located at the operational position.

21 Claims, 7 Drawing Sheets

STRUCTURE FOR HOLDING FUNCTIONAL DEVICE

BACKGROUND OF THE INVENTION

The present invention relates to a structure for holding functional devices attached to a panel in a passenger compartment of a vehicle.

Functional devices, such as switches, are mounted on an instrument panel of a vehicle to operate various types of electric equipment. Examples of such switches include a switch for adjusting the angle of a side view mirror and a switch for moving the side view mirror between a normal position and a folded position. Such switches are arranged separately from one another. Further, the function associated with each switch differs depending on the grade of the vehicle type or the selected option. This changes the number of switches mounted on the instrument panel.

Identical instrument panels may be used for different types of vehicles and different grades of the same vehicle type. In such a case, the number of openings formed to receive switches is in accordance with the grade in each vehicle type that has the largest number of switches mounted on the instrument panel. Thus, as the number of switches mounted on the instrument panel decreases, the number of openings that do not receive any switch increases. Such openings are covered by cover plates.

However, the plates, which cover the openings that do not receive switches, degrade the aesthetic appearance of the instrument panel. The number of automated devices and communication-related devices operated by switches have been increasing. This has increased the difference between the number of switches mounted on instrument panels in accordance with grade in each vehicle type and the selected option. Further, the increased number of switches also degrades the aesthetic appearance of the instrument panel.

Functional devices are not limited to switches and also include coin cases and card cases. The number of such devices also changes in accordance with the grade of each vehicle type or the selected option.

SUMMARY OF THE INVENTION

It is an object of the present invention to provide a structure for holding functional devices that maintains the aesthetic appearance of a panel in a passenger compartment of a vehicle regardless of the number of functional devices.

To achieve the above object, the present invention provides a structure for holding a functional device in a passenger compartment of a vehicle. The structure includes a first functional unit arranged on a panel in the passenger compartment. The first functional unit includes a functional device. A second functional unit is arranged adjacent to the first functional unit. A common shaft is shared by the first and second functional units and pivotally supports the first and second functional units. The first and second functional units are each pivoted about the common shaft between a retracted position and an operational position. The first and second functional units are each accommodated in the panel when located at the retracted position and exposed from the panel when located at the operational position. The first functional unit remains at the retracted position when the second functional unit is located at the operational position.

A further perspective of the present invention is a structure for holding a functional device in a passenger compartment of a vehicle. The structure includes a switchboard arranged on a panel in the passenger compartment. The switchboard includes a functional device. An accommodating case is arranged adjacent to the switchboard. A holder holds the switchboard and the accommodating case in the panel. A common shaft is shared by the switchboard and the accommodating case and pivotally supports the switchboard and the accommodating case. The switchboard and the accommodating case are each pivoted about the common shaft between a retracted position and an operational position. The switchboard and the accommodating case are each accommodated in the panel when located at the retracted position and exposed from the panel when located at the operational position. The switchboard remains at the retracted position when the accommodating case is located at the operational position. A first spring connects the switchboard and the accommodating case to each other and urges the accommodating case toward the operational position. The first spring pivots the accommodating case integrally with the switchboard when the switchboard is pivoted between the retracted position and the operational position. A second spring connects the switchboard and the holder to each other and urges the switchboard toward the operational position. A lever is connected to the switchboard and has an engaging pin. A cam is pivotally supported on the holder and has a guide groove that engages the engaging pin. A third spring urges the cam in a predetermined direction to arrange the switchboard at the operational position. The third spring engages the engaging pin with the guide groove to hold the switchboard at the retracted position. When the lever is moved against the urging force of the third spring, the engaging pin is disengaged from the guide groove and the urging force of the second spring moves the switchboard to the operational position. A restriction pin is arranged on the accommodating case. The restriction pin contacts the cam and restricts the disengagement of the engaging pin from the guide groove of the cam when the accommodating case is located at the operational position.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A structure for holding functional devices according to a first embodiment of the present invention will now be discussed with reference to FIGS. 1 to 12.

Figure 1:
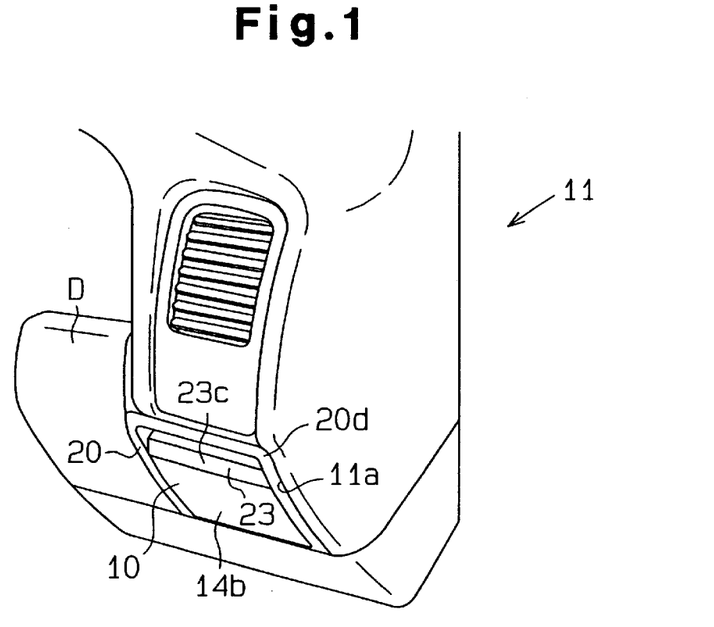
FIG. 1 is a perspective view showing a switch box, which is arranged at a retracted position, according to a first embodiment of the present invention.
Figure 2:
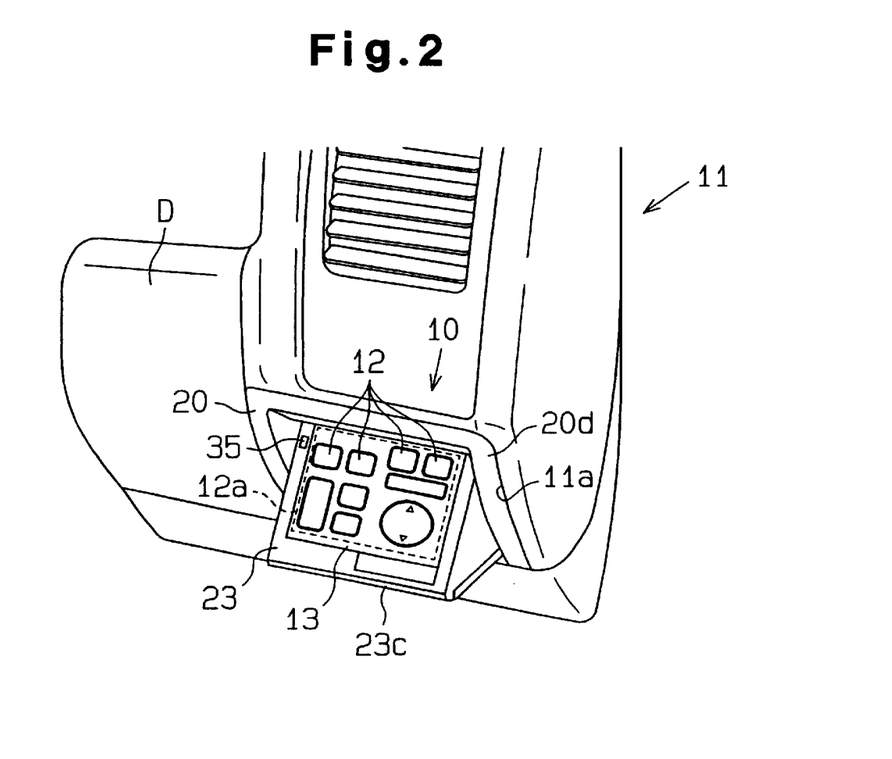
FIG. 2 is a perspective view showing a switchboard of the switch box of FIG. 1 in a first operational state.
Figure 3:
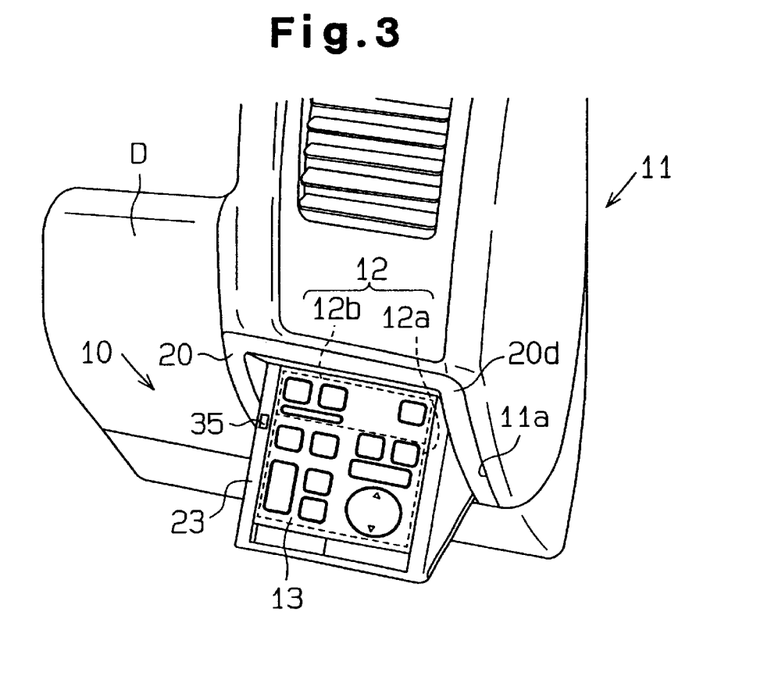
FIG. 3 is a perspective view showing the switchboard in a second operational state.
Figure 4:
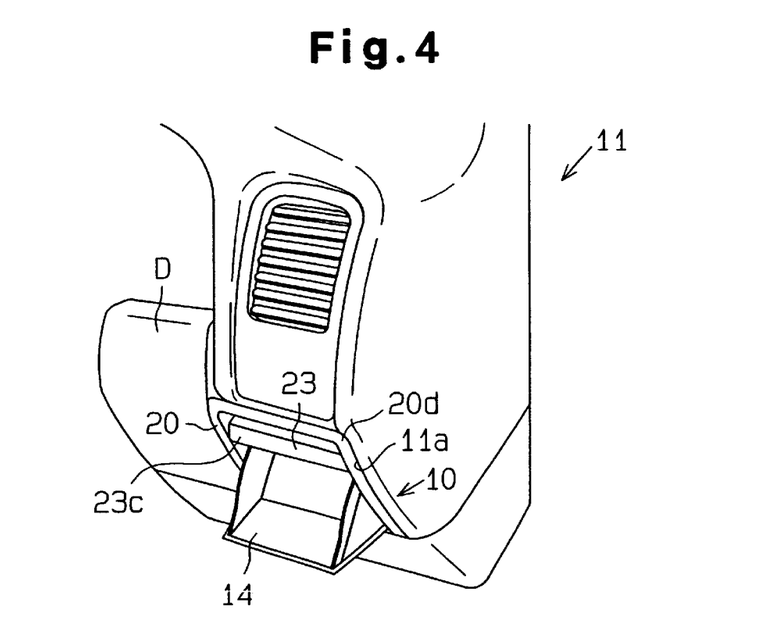
FIG. 4 is a perspective view showing an accommodating case, which accommodates the switch box of FIG. 1, in an opened state.
Figure 5:
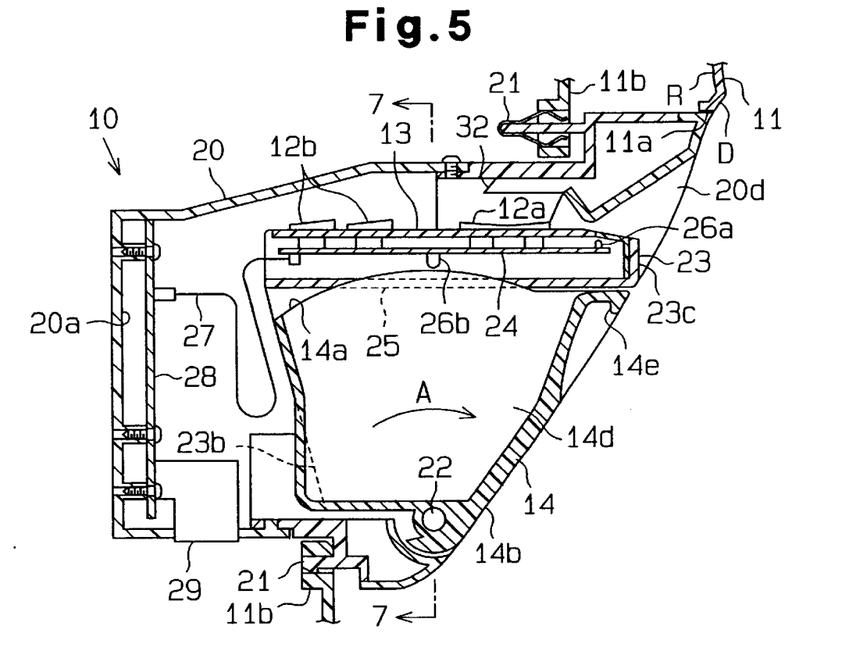
FIG. 5 is a cross-sectional view of the switch box of FIG. 1.

Referring to FIGS. 1 to 4, a switch box 10 is installed in one end of an instrument panel 11. The switch box 10 includes a switchboard 13 and an accommodating case 14, which serve as functional units. The switchboard 13 and the accommodating case 14 are adjacent to each other. Switches 12 used to operate electric devices are mounted on the switchboard 13. The surface of the switchboard 13 on which the switches 12 are mounted serves as a functional plane, which has a functional role. The switches 12 serve as functional devices. The switchboard 13 and the accommodating case 14 move between a retracted position (FIG. 1) and operational positions (FIGS. 2 to 4). The switchboard 13 has two operational positions, a first operational position and a second operational position. The switchboard 13 is half-opened when in the first operational position (the state shown in FIG. 2) and fully opened when in the second operational position (the state shown in FIG. 3).

The structure of the switch box 10 will now be discussed with reference to FIGS. 5 to 12. The switch box 10 includes a holder 20. The instrument panel 11 has an external surface D in which a holder opening 11a is formed. The holder opening 11a receives the holder 20. The holder 20 extends into the instrument panel 11 and has a plurality of tongues 21, which are engaged with engaging portions lib defined in the inner side R of the instrument panel 11. Further, the holder 20 accommodates the switchboard 13 and the accommodating case 14. A common shaft 22, which is shared by the switchboard 13 and the accommodating case 14, extends sideward through the lower portion of the holder 20.

The accommodating case 14 has an opened top portion 14a, which serves as a functional plane having a functional role. Objects are inserted in and removed from the accommodating case through the opened top portion 14a. When the accommodating case 14 is arranged at the retracted position, or accommodated in the holder 20, the opened top portion 14a is located in the inner side R of the instrument panel 11. That is, the opened top portion 14a is located inward to a plane flush with the external surface D of the instrument panel 11. Further, the accommodating case 14 has a front surface 14b, which is partially flush with the surface of the instrument panel 11 when the accommodating case 14 is retracted in the holder 20. A tab 14e, which is pulled by an occupant of the vehicle, is formed on the front surface 14b of the accommodating case 14. The operator pulls the tab 14e to pivot the accommodating case 14 about the common shaft 22 by means of a turnover mechanism 40 between the retracted position and the operational position. The accommodating case 14 moves in the clockwise direction as indicated by arrow A in FIG. 5 when pivoted from the retracted position to the operational position.

A support 23 covers the opened top 14a of the accommodating case 14 when the accommodating case 14 is located at the retracted position. The switchboard 13 is attached to the support 23. A switch substrate 24 is connected to the support 23 under the switchboard 13. Further, the support 23 has a cover 25, which covers the entire lower surface of the switch substrate 24, and side walls 23a, 23b, which cover lateral side walls 14c, 14d of the accommodating case 14.

When the switchboard 13 is arranged at the retracted position, or retracted in the holder 20, the support 23 is located in the inner side R of the instrument panel 11. That is, the support 23 is located inward to the plane flush with the external surface D of the instrument panel 11. The support 23 has a front surface 23c, which is partially flush with the external surface D when the switchboard 13 is arranged at the retracted position. The support 23 is pivoted about the common shaft 22 by means of a push-open mechanism 50 between the retracted position and the operational position.

One of more indicator LEDs 26a (only one shown in FIG. 5) are mounted on the upper rear surface of the switch substrate 24. Further, illumination LEDs 26b (only one shown in FIG. 5) are connected to the lower surface of the switch substrate 24 to illuminate the interior of the accommodating case 14.

The switch substrate 24 is connected to a switch electronic control unit (ECU) substrate 28, which is attached to an inner surface 20a of the holder 20 by a flat wire 27. A connector 29 is connected to the switch substrate 24. A wire harness terminal (not shown), which binds wires that extend from electric devices (not shown), is connected to the connector 29.

Further, as shown in FIGS. 2 and 3, in accordance with the frequency of usage, the switches 12, which are arranged on the switchboard 13, are divided into first and second switch groups 12a, 12b. More particularly, the switches 12 in the first switch group 12a, which consists of switches 12 that are relatively often used, are arranged on the switchboard 13 so that they are exposed from the holder 20 and thus visible to the vehicle occupant when the switchboard 13 is arranged at the first operational position (FIG. 2). In this state, the switches 12 of the second switch group 12b, which consists of switches 12 that are relatively not often used, are not exposed from the holder 20 and thus not visible. The first switch group 12a becomes exposed and visible to the vehicle occupant when the switchboard 13 is arranged at the second operational position and fully opened.

Figure 6:
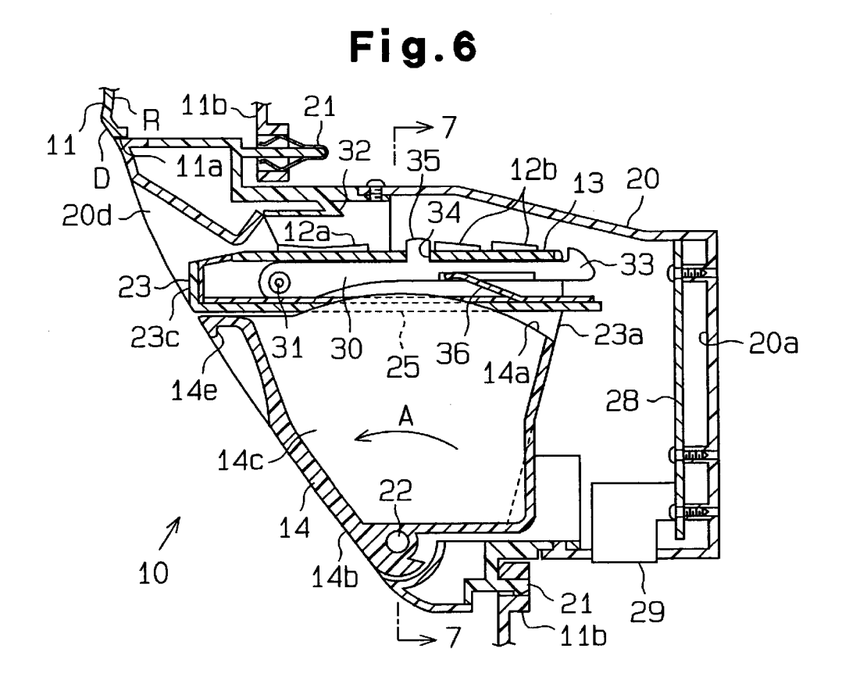
FIG. 6 is a cross-sectional view of the switch box of FIG. 1.

As shown in FIG. 6, a shift arm 30, which moves the switchboard 13 from the first operational position to the second operational position is arranged between the switchboard 13 and the cover 25. The shift arm 30 is plate-like and extends in the longitudinal direction of the vehicle. An arm shaft 31 is connected to the rear end of the arm 30 so that the shift arm 30 is pivotal about the arm shaft 31. The front end of the shift arm 30 moves upward or downward when the shift arm 30 is pivoted. A hook 33 extends from the front end of the shift arm 30 to engage a hooking portion 32, which is defined on the inner surface of the holder 20.

A through hole 34 extends through the support 23 at a position that is visible when the switchboard 13 is located at the first operational position. A shift button 35 projects upward from the shift arm 30 and extends through the through hole 34. A cantilevered plate spring 36 is arranged between the lower surface of the shift arm 30 and the upper surface of the cover 25 to urge the shift arm 30 upward.

Figure 7:
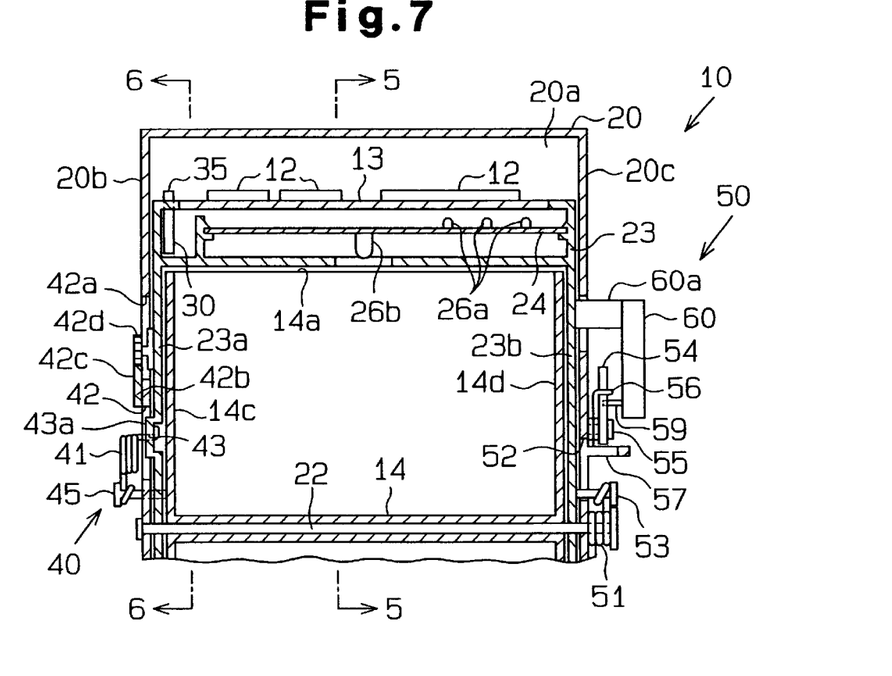
FIG. 7 is a cross-sectional view taken along line 7—7 in FIG. 5.
Figure 8:
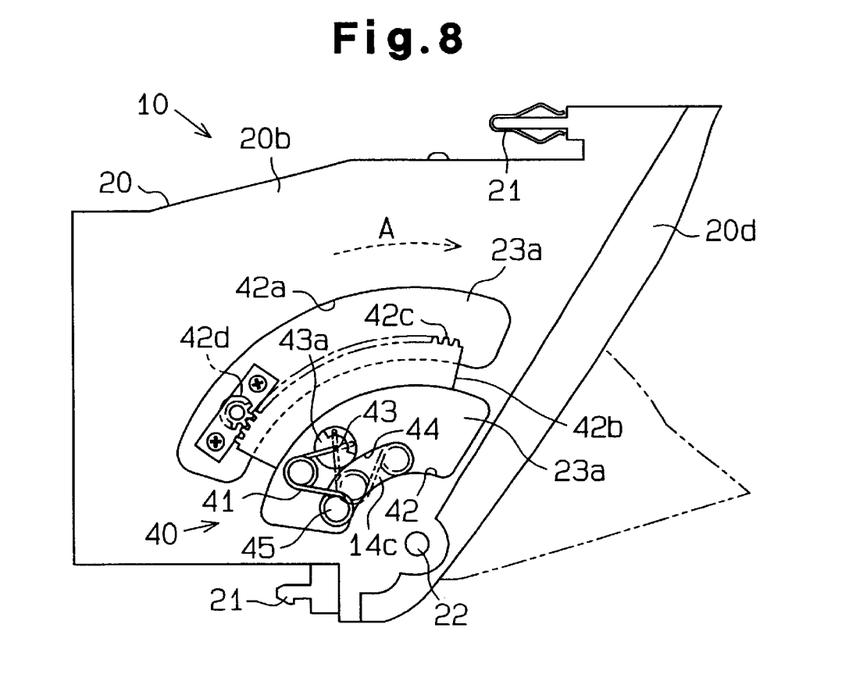
FIG. 8 is a side view showing the switch box of FIG. 1.

As shown in FIGS. 7 and 8, a first helical spring 41, which extends through a first opening 42 formed in a lateral side wall 20b of the holder 20, is arranged between the side wall 23a of the support 23 and the side wall 14c of the accommodating case 14. One end of the first helical spring 41 is bent and inserted in an insertion hole 43, extending through the side wall 23a of the support 23. This hooks the first helical spring 41 to the insertion hole 43. The first helical spring 41 is supported by a seat 43a, which is defined next to the insertion hole 43 on the side wall 23a. The engagement of the first helical spring 41 and the insertion hole 43 enables the first helical spring 41 to be pivoted in the first opening 42 relative to the side wall 23a of the support 23. The other end of the first helical spring 41 is hooked to a pin 45. The pin 45 extends from the side wall 14c of the accommodating case 14 through a second hole 44, which is formed in the side wall 23a of the support 23, and the first opening 42. The first helical spring 41 forms part of the turnover mechanism 40 and urges the accommodating case 14 in the direction indicated by arrow A in FIG. 8.

An arcuate second opening 42a, which is concentric with the first opening 42, is formed on the side wall 20b of the holder 20. A flat arcuate guide 42b is formed between the first and second openings 42, 42a on the side wall 20b. The guide 42b partially overlaps the second opening 42a. A rack 42c is formed along the edge of the guide 42b over the second opening 42a. A pinion 42d is attached to the side wall 23a of the support 23. The pinion 42d is meshed with and rotated along the rack 42c. This guides the pivoting of the support 23.

Figure 9:
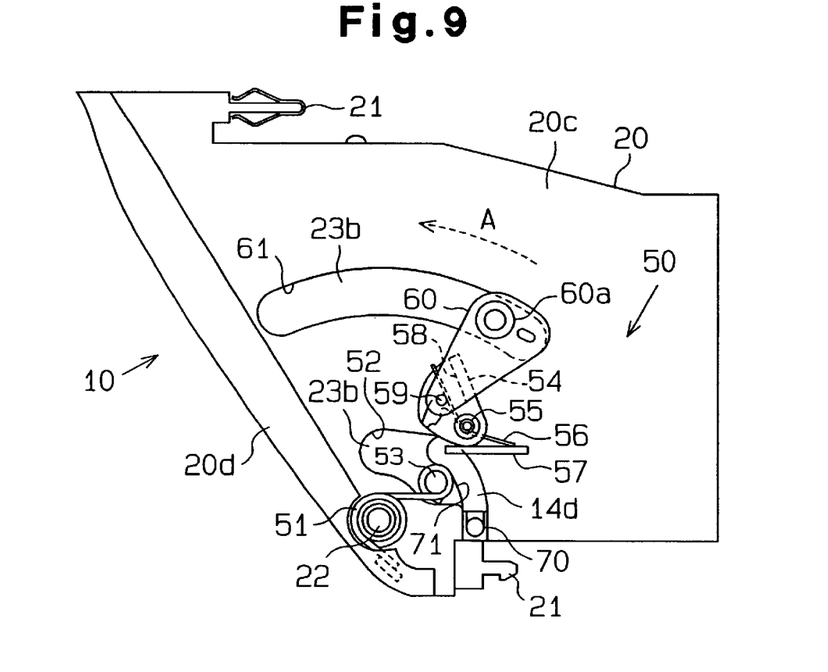
FIG. 9 is a side view showing the switch box of FIG. 1.

Referring to FIGS. 7 and 9, a second helical spring 51 is arranged between the side wall 23b of the support 23 and a frame 20d of the accommodating case 14 on a lateral side wall 20c of the holder 20. One end of the second helical spring 51 is hooked to a pin 53. The pin 53 extends from the side wall 23b of the support 23 and through a generally arcuate elongated hole 52, which is formed in the side wall 20c of the holder 20. Further, the second helical spring 51 is wound about the common shaft 22, and the other end of the second helical spring 51 contacts the rear surface of the frame 20d. The second helical spring 51 forms part of the push-open mechanism 50 and urges the support 23 and the accommodating case 14 toward the direction indicated by arrow A in FIG. 9.

A cam 54, which forms part of the push-open mechanism 50, is supported in a manner pivotal about a pivot shaft 55 on the outer surface of the side wall 20c. A third helical spring 56 is arranged between the side wall 20c of the holder 20 and the cam 54. One end of the third helical spring 56 is in contact with a projection 57, which extends in the longitudinal direction of the vehicle on the side wall 20c of the holder 20. The other end of the third helical spring 56 is hooked to the cam 54. The third helical spring 56 urges the cam 54 in the direction indicated by arrow A in FIG. 9. Further, when the switchboard 13 is located at the first or second operational position, the projection 57 prevents the cam 54 from being further pivoted from a predetermined position.

As shown in FIGS. 10A to 10D, a guide groove 58, which has a predetermined pattern, extends along the outer surface of the cam 54. An entrance 58a, an exit 58b, and a pin retaining portion 58c, which is located between the entrance 58a and the exit 58b, are defined in the guide groove 58.

As shown in FIG. 9, one end of a lever 60 is attached to the outer surface of the side wall 23b of the support 23 by means of a support shaft 60a, which extends through an arcuate hole 61 formed in the side wall 20c of the holder 20. An engaging pin 59 extends from the other end of the lever 60, which is opposed to the outer surface of the side wall 20c of the holder 20.

A restriction pin 70 is arranged on the lower portion of the side wall 14d of the accommodating case 14 to restrict the movement of the switchboard 13 from the retracted position to the operational position when the accommodating case 14 is located at the operational position. The restriction-pin 70 extends through an arcuate hole 71, which is formed in the side wall 23b of the support 23, and the elongated hole 52, which is formed in the side wall 23b of the support 23. The restriction pin 70 is pivoted together with the accommodating case 14 and contacts the cam 54 when the accommodating case 14 is moved to the operational position. The contact between the restriction pin 70 and the cam 54 restricts the pivoting of the cam 54 in the direction indicated by arrow 9 in FIG. 9.

Figure 10A:
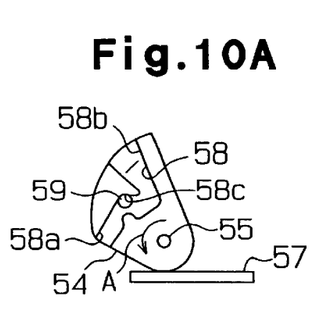
FIGS. 10A to 10D are schematic diagrams illustrating the engagement and disengagement of a cam and a follower in the switch box of FIG. 1.

When the switchboard 13 is located at the retracted position, the restriction pin 70 is retained in the pin retaining portion 58c, as shown in the state of FIG. 10A.

Figure 10B:
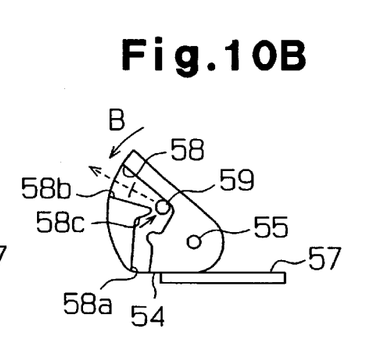

To move the switchboard 13 from the retracted position to the first operational position, the vehicle occupant presses the front surface 23c of the support 23 (FIG. 6) forward, that is, in a direction opposite to the direction indicted by arrow A in FIGS. 6 and 9. This pivots the support 23 about the common shaft 22 (FIG. 6) in the direction opposite to arrow A in FIGS. 6 and 9. As the support 23 pivots, the lever 60 and the engaging pin 59 also pivot in the same direction. In this state, the third helical spring 56 urges the cam 54 in a direction indicated by arrow B in FIG. 10B about the pivot shaft 55. Thus, the cam 54 is pivoted in a direction opposite to the pivoting direction of the engaging pin 59. This disengages the engaging pin 59 from the pin retaining portion 58c of the guide groove 58, as shown in the state of FIG. 10B.

In this state, when the vehicle occupant stops pressing the front surface of the support 23, the urging force of the second helical spring 51 pivots the support 23 together with the accommodating case 14 about the common shaft 22 in the direction indicated by arrow A in FIGS. 6 and 9. Simultaneously, the engaging pin 59 pivots together with the support 23, passes through the exit 58b of the guide grove 58, and gradually moves away from the cam 54. As the support 23 pivots in the direction indicated by arrow A in FIGS. 6 and 9, the hook 33 of the shift arm 30 engages the hooking portion 32 of the holder 20. The engagement of the hook 33 and the hooking portion 32 temporarily restricts the pivoting of the support 23 in the direction indicated by arrow A in FIG. 11. In this state, the switchboard 13 is located at the first operational position.

To move the switchboard 13 from the first operational position to the second operational position, the vehicle occupant presses the shift button 35 of the shift arm 30 against the urging force of the plate spring 36. This pivots the shift arm 30 about the arm shaft 31 to a position shown by the broken lines in FIG. 11. As a result, the hook 33 of the shift arm 30 is disengaged from the hooking portion 32 of the holder 20. The urging force of the second helical spring 51 pivots the support 23, together with the accommodating case 14, about the common shaft 22 in the direction indicated by arrow A in FIG. 11. This moves the switchboard 13 to the second operational position.

To move the switchboard 13 from the first or second operational position to the retracted position, the vehicle occupant presses the front surface 23c of the support 23 in a direction opposite to the direction indicated by arrow A in FIGS. 6 and 9 against the urging force of the second helical spring 51. This pivots the support 23 and the accommodating case 14 about the common shaft 22 in a direction opposite to arrow A in FIGS. 6 and 9. The pivoting of the support moves the engaging pin 59 of the lever 60 in the same direction.

Figure 10C:
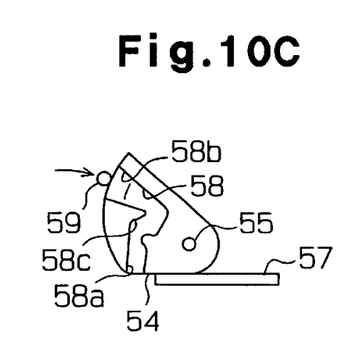

As the engaging pin 59 moves, the engaging pin 59 comes into contact with the edge of the cam 54, as shown in the state of FIG. 10C. Further movement of the engaging pin 59 pivots the cam 54 about the pivot shaft 55 in the direction indicated by arrow C in FIG. 10D against the urging force of the third helical spring 56.

Figure 10D:
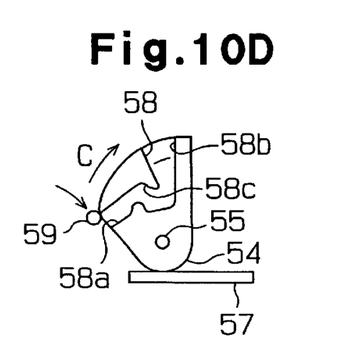
Figure 11:
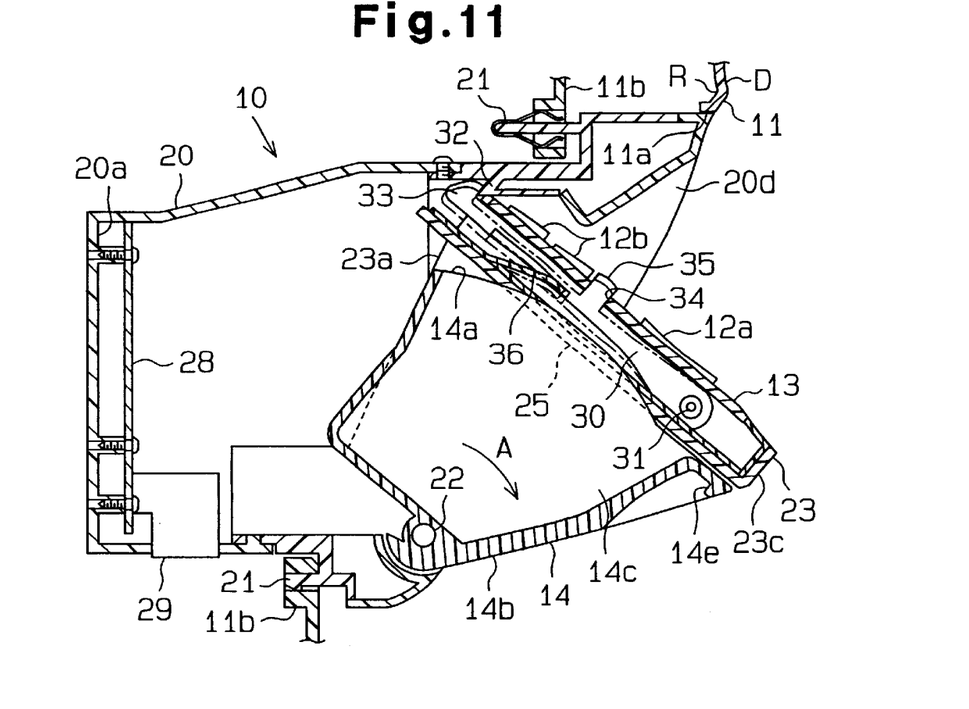
FIG. 11 is a cross-sectional view of the switch box of FIG. 11.
Figure 12:
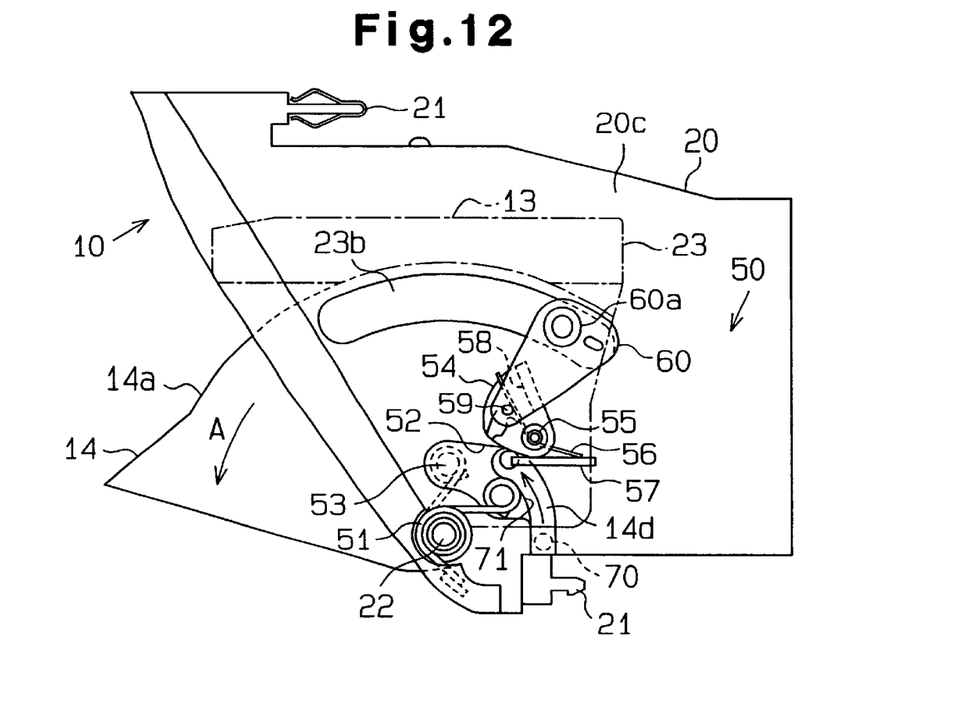
FIG. 12 is a side view showing the switch box of FIG. 1.

When the engaging pin 59 reaches the entrance 58a of the guide groove 58, the urging force of the third helical spring 56 pivots the cam 54 in a direction opposite to the direction indicated by arrow C in FIG. 10D. Consequently, the engaging pin 59 enters the guide groove 58 from the entrance 58a. Further, the pivoting of the cam 54 relatively moves the engaging pin 59 in the guide groove 58 from the entrance 58a to the pin retaining portion 58c. Subsequently, when the vehicle occupant stops pushing the front surface 23c of the support 23, the urging force of the second helical spring 51 slightly pivots the support in the direction indicated by arrow A in FIGS. 6 and 9. However, the engagement between the engaging pin 59 of the lever 60 and the pin retaining portion 58c of the cam 54 restricts further pivoting of the support 23 in the direction indicated by arrow A in FIGS. 6 and 9 and holds the switchboard 13 in the retracted position.

To move the accommodating case 14 from the retracted position to the operational position, in which the accommodating case 14 is opened, the vehicle occupant pulls and pivots the accommodating case 14 in the direction indicated by arrow A in FIGS. 6 and 9 against the urging force of the first helical spring 41. This exposes the opened top 14a of the accommodating case 14 from the holder 20 and arranges the accommodating case 14 at the operational position. When the accommodating case 14 is pivoted, the restriction pin 70 pivots in the same direction to contact the cam 54. This restricts the movement of the switchboard 13.

When the accommodating case 14 is located at the operational position and the vehicle occupant presses the front surface 23c of the support 23, the support 23 is pivoted in a direction opposite to the direction indicated by arrow A in FIGS. 6 and 9. Further, the engaging pin 59 of the lever 60 pivots in the same direction. The pivoting of the engaging pin 59 temporarily disengages the engaging pin 59 from the pin retaining portion 58c in the guide groove 58 of the cam 54.

However, the restriction pin 70 restricts the pivoting of the cam 54 in the direction indicated by arrow A in FIGS. 6 and 9. Thus, even when the vehicle occupant stops pressing the front surface 23c of the support 23 and the support 23 pivots in the direction indicated by arrow A in FIGS. 6 and 9, the engaging pin 59 comes into engagement with the pin retaining portion 58c of the cam 54 again. This restricts the movement of the switchboard 13 from the retracted position to the operational positions when the accommodating case 14 is located at the operational position.

The first embodiment has the advantages described below.

(1) The switchboard 13 and the accommodating case 14 share the same common shaft 22 and are independently moved to the corresponding operational positions. Thus, the switchboard 13 and the accommodating case 14, which would have been separately attached to the instrument panel 11 in the prior art, are arranged together in the switch box 10, which is received in the holder opening 11a of the instrument panel 11. When the switchboard 13 and the accommodating case 14 are not used, the switchboard 13 and the accommodating case 14 are retracted in the inner side R of the instrument panel 11. Thus, the instrument panel does not require exclusive area for the switchboard 13 and for the accommodating case 14 like in the prior art. This improves the aesthetic appearance of the instrument panel 11.

(2) The switchboard 13, on which a plurality of switches 12 are mounted, are accommodated in the switch box 10. Thus, the switches 12, which would have been mounted on the instrument panel 11 in the prior art, are concentrated on the single switchboard 13. This not only improves the aesthetic appearance of the instrument panel 11 but also significantly reduces the number of substrates required for the switches 12 and simplifies the wiring of the switches 12.

(3) By providing the switch box 10 with the accommodating case 14, the space in the inner side R of the instrument panel 11 is effectively used.

(4) The switchboard 13 and the accommodating case 14 are both accommodated in the same holder 20, which is attached to the instrument panel 11. In other words, the switchboard 13 and the accommodating case 14 are accommodated in the same holder opening 11a of the instrument panel 11. This improves the aesthetic appearance of the instrument panel 11.

(5) When the switchboard 13 and the accommodating case 14 are retracted in the holder 20, the switchboard 13 and the opened top portion 14a of the accommodating case 14 are located inward relative to a plane flush with the external surface D of the instrument panel 11. Further, the front surface 14b of the accommodating case 14 and the front surface 23c of the support 23 are partially flush with the external surface D of the instrument panel 11. This improves the aesthetic appearance of the instrument panel 11 when the switchboard 13 and the accommodating case 14 are retracted.

(6) The push-open mechanism 50 moves the switchboard 13 between the retracted position and the operational positions. Further, the turnover mechanism 40 moves the accommodating case 14 between the retracted position and the operational position. Thus, the switchboard 13 and the accommodating case 14 smoothly move between the accommodating and operational positions.

(7) The restriction pin 70 restricts the movement of the switchboard 13 from the retracted position to the operational positions when the accommodating case 14 is in the operational position. Thus, the switchboard 13 is prevented from being unintentionally moved from the retracted position to the operational positions when the accommodating case 14 is located in the operational position and opened. Accordingly, there is no interference when the accommodating case 14 is being used.

(8) The switchboard 13 is pivoted between two stages, the first operational position and the second operational position. This enables the grouping of the switches 12 in accordance with how frequently the switches 12 are used. Thus, the convenience of the switchboard 13 is improved.

(9) The shift arm 30 is employed to move the switchboard 13 from the first operational position to the second operational position. This smoothens the pivoting of the switchboard 13 from the first operational position to the second operational position.

(10) The switches 12 are divided into the first switch group 12a and the second switch group 12b in accordance with how often the switches are operated. Further, the first switch group 12a, which includes switches 12 that are relatively often used, is arranged on the switchboard 13 at a location exposed to the vehicle occupant when the switchboard 13 is located at the first operational position. The second switch group 12b, which includes switches 12 that are not used often, is arranged on the switchboard 13 at a location that is not exposed to the vehicle occupant when the switchboard 13 is located at the first operational position but exposed when the switchboard 13 is located at the second operational position. Accordingly, the switches 12 are arranged in an efficient manner.

(11) The indicator LEDs 26a and the illumination LEDs 26b are connected to the switch substrate 24 of the switches 12. Thus, in a dark environment, such as during the nighttime, the switchboard 13 and the accommodating case 14 may be illuminated. This facilitates the operation of the switchboard 13 and the accommodating case 14. Further, the switch box 10 is provided with illumination functions without significantly increasing costs simply by connecting LEDs to the switch substrate 24.

(12) A plurality of switches are normally attached to the instrument panel 11 within a limited area. However, by attaching the switch box 10 to the instrument panel 11, the number of switch openings that are closed by cover plates are drastically reduced. Thus, the present invention is especially advantageous when using the same instrument panel for different vehicle types or different grades of the same vehicle type.

Figure 13:
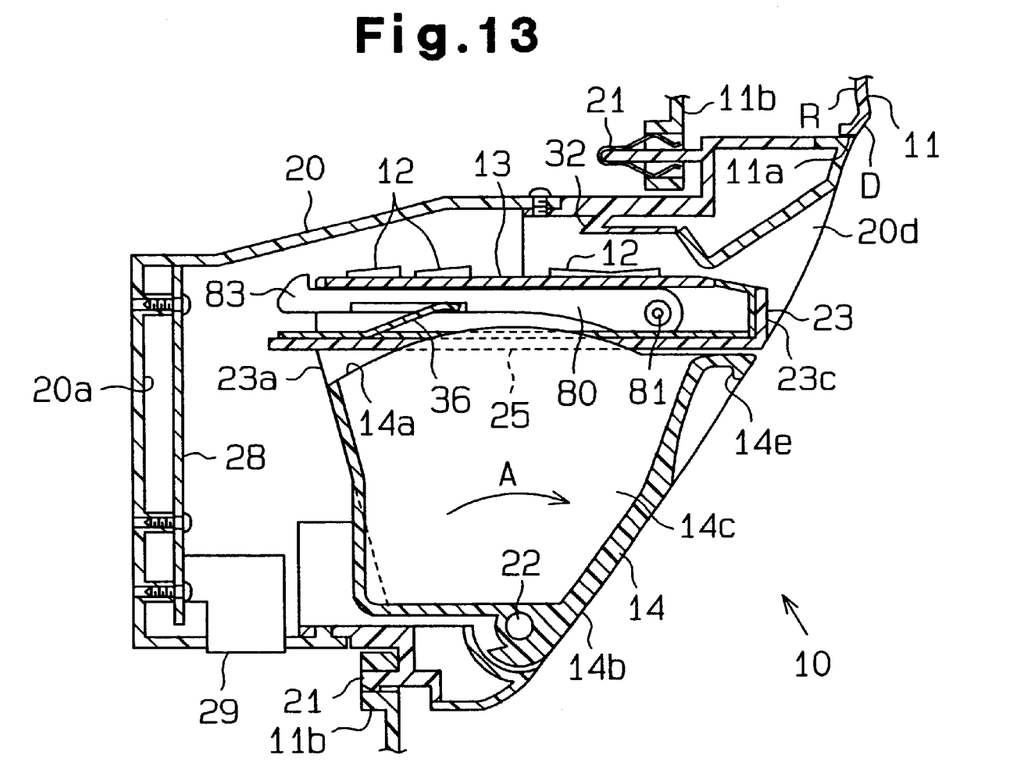
FIG. 13 is a cross-sectional view of a switch box according to a second embodiment of the present invention.

A second embodiment according to the present invention will now be discussed with reference to FIG. 13. In FIG. 13, like or same reference numerals are given to those components that are the same as the corresponding components in FIGS. 1 to 12.

In the second embodiment, a restriction arm 80 is used in lieu of the shift arm 30 of the first embodiment to restrict further pivoting of the switchboard 13 from a half-opened position (operational position) when the switchboard 13 is moved from the retracting position to the operational position.

Referring to FIG. 13, the restriction arm 80 differs from the shift arm 30 of the first embodiment only in that the shift button 35 is not provided. One end of the restriction arm 80 is pivotally supported about a pivot shaft 81. A hook 83, which is engaged with the hooking portion 32 of the holder 20, is formed on the other end of the restriction arm 80. Like the first embodiment, the plate spring 36 urges the restriction arm 80 upward.

To shift the switchboard 13 from the retained position to an operational position in the switch box 10 of the second embodiment, the vehicle occupant presses the front surface 23c of the support 23. This causes the push-open mechanism 50 to pivot the switchboard 13 in the direction indicated by arrow A in FIG. 13. When the switchboard 13 is pivoted by a predetermined amount, the hook 83 of the restriction arm 80 engages the hooking portion 32 of the holder 20. This restricts further pivoting of the switchboard 13 in the direction indicated by arrow A in FIG. 13. In this state, the plate spring 36 applies an urging force to the restriction arm 80. Further, the restriction arm 80 does not have the shift button 35. Thus, the hook 83 of the restriction arm 80 remains engaged with the hooking portion 32 of the holder 20. Accordingly, the switchboard 13 does not pivot to a fully opened position from the half-opened position.

In addition to advantages (1) to (7), (11), and (12), the second embodiment has the advantage described below.

(13) The restriction arm 80 restricts further pivoting of the switchboard 13 from the half-opened position. Thus, when the number of switches 12 mounted on the switchboard 13 is small, the switches 12 are mounted on part of the switchboard 13 so that all of the switches 12 are exposed to the vehicle occupant when the switchboard 13 is located at the half-opened position. Accordingly, the same switchboard 13 may be used for different types of vehicles or for different grades of the same type of vehicle. This reduces manufacturing costs.

It should be apparent to those skilled in the art that the present invention may be embodied in many other specific forms without departing from the spirit or scope of the invention. Particularly, it should be understood that the present invention may be embodied in the following forms.

In the first embodiment, the switchboard 13 is pivoted between the two stages, the-first operational position and the second operational position. However, the switchboard 13 may be pivoted between three or more stages. In such case, the switches 12 may be mounted on the switchboard 13 divided into three or more groups. Further, the pivoting amount of the switchboard 13 between different stages is not restricted and may be changed as required.

In the first embodiment, the shift arm 30 may be eliminated so that the switchboard 13 is pivoted to only one operational position. In this case, the through hole 34 and the plate spring 36 are also eliminated.

In the first embodiment, the switches 12 are divided into two switch groups 12a, 12b. However, the switches 12 may be divided in accordance with its function.

In each of the above embodiments, the number, shape, size, and position of the switches 12 arranged on the switchboard 13 may be determined as required.

In each of the above embodiments, the switchboard 13 and the accommodating case 14 are pivoted about an axis extending in the lateral direction of the vehicle. However, the switchboard 13 and the accommodating case 14 may be configured to be pivoted about an axis extending in the longitudinal direction of the vehicle.

In each of the above embodiments, a functional device other than the switches 12, such as a coin case, may be arranged on the switchboard 13.

In each of the above embodiments, the switchboard 13 and the accommodating case 14 are employed as the functional units. However, other functional units, such as a card tray, a coin case, a can (bottle) holder, a passenger compartment light, an ashtray, a fuse box, and an electric power socket may be employed as the functional unit. These functional units may be combined with each other. Further, the functional units may be pivoted by means of the turnover mechanism 40 or the push-open mechanism.

A plurality of the same functional unit may be accommodated in the same switch box 10.

In each of the above embodiments, the switchboard 13 is pivoted by the push-open mechanism 50, and the accommodating case 14 is pivoted by the turnover mechanism 40. However, the mechanism for pivoting of the switchboard 13 and the accommodating case 14 is not restricted. For example, the switchboard 13 may be pivoted by a turnover mechanism and the accommodating case 14 may be pivoted by a push-open mechanism. Further, one of the mechanisms 40, 50 may be eliminated.

In each of the above embodiments, the indicator LEDs 26a and the illumination LEDs 26b are employed. However, other LEDs, such as LEDs for illuminating the switches 12, may be employed. Further, lighting devices other than LEDs, such as bulbs, may be used. Alternately, the LEDs may be eliminated.

In each of the above embodiments, only one switch box 10 is arranged on one end of the instrument panel 11 near the driver's seat. However, the switch box 10 may be arranged at any position, such as the middle portion or upper portion of the instrument panel 11. Further, more than one switch box 10 may be attached to the instrument panel 11.

In the above embodiments, the present invention is applied to the instrument panel 11. However, the present invention may be applied to other panels in the vehicle, such as a door trim, a garnish, a package tray, a seat, or an armrest.

The present examples and embodiments are to be considered as illustrative and not restrictive, and the invention is not to be limited to the details given herein, but may be modified within the scope and equivalence of the appended claims.

What is claimed is:

1. A structure for holding a functional device in a passenger compartment of a vehicle, the structure comprising:
    a first functional unit arranged on a panel in the passenger compartment, wherein the first functional unit includes a functional device;
    a second functional unit arranged adjacent to the first functional unit;
    a common shaft shared by the first and second functional units and pivotally supporting the first and second functional units, wherein the first and second functional units are each pivoted about the common shaft between a retracted position and an operational position, the first and second functional units each being accommodated in the panel when located at the retracted position and being exposed from the panel when located at the operational position, wherein the first functional unit remains at the retracted position when the second functional unit is located at the operational position.

2. The structure according to claim 1, further comprising a holder for holding the first and second functional units, wherein the holder is received in an opening formed in the panel.

3. The structure according to claim 2, wherein the first and second functional units each include a functional plane, which has a functional role, and a front surface, which is exposed from the panel when located at the retracted position, wherein the functional device is arranged on the functional plane of the first functional unit, and wherein, when the first and second functional units are each arranged at the retracted position, the associated functional plane is arranged in the panel and at least part of the associated front surface is flush with the panel.

4. The structure according to claim 3, further comprising a first spring connecting the first and second functional units to each other and urging the second functional unit toward the operational position, wherein the first spring pivots the second functional unit integrally with the first functional unit when the first functional unit is pivoted between the retracted position and the operational position.

5. The structure according to claim 4, further comprising a second spring for connecting the first functional unit and the holder to each other and urging the first functional unit toward the operational position.

6. The structure according to claim 5, further comprising:
    a lever connected to the first functional unit and having an engaging pin;
    a cam pivotally supported on the holder and having a guide groove that engages the engaging pin;
    a third spring for urging the cam in a predetermined direction to arrange the first functional unit at the operational position, wherein the third spring engages the engaging pin with the guide groove to hold the first functional unit at the retracted position, and wherein, when the lever is moved against the urging force of the third spring, the engaging pin is disengaged from the guide groove and the urging force of the second spring moves the first functional unit to the operational position.

7. The structure according to claim 6, further comprising:
    a restriction pin arranged on the second functional unit, wherein the restriction pin contacts the cam and restricts the disengagement of the engaging pin from the guide groove of the cam when the second functional unit is located at the operational position.

8. The structure according to claim 4, wherein the first functional unit includes:
    an arm arranged under the functional plane;
    an arm shaft pivotally supporting the arm;
    a hook arranged on the arm; and
    a plate spring for urging the arm toward the functional plane; and
    wherein the holder includes:
        a hooking portion engaged with the hook when the first functional unit is located at the operational position to restrict further pivoting of the first functional unit.

9. The structure according to claim 8, wherein the operational position of the first functional unit is one of a first operational position and a second operational position, wherein the arm has a button extending through the functional plane, and wherein the hook engages the hooking portion when the first functional unit is located at the first operational position, and by pushing the button against the urging force of the plate spring when the first functional unit is located at the first operational position, the hook is disengaged from the hooking portion to permit further pivoting of the first functional unit to the second operational position.

10. The structure according to claim 9, wherein the functional device of the first functional unit includes a plurality of switches, wherein the switches are grouped into a first switch group, which is exposed from the panel when the first functional unit is located at any one of the first operational position and the second operational position, and a second switch group, which is exposed from the panel only when the first functional unit is located at the second operational position.

11. The structure according to claim 10, wherein the first functional unit includes a lighting device for illuminating the switches.

12. The structure according to claim 7, wherein the first functional unit includes:
    an arm arranged under the functional plane;
    an arm shaft pivotally supporting the arm;
    a hook arranged on the arm; and
    a plate spring for urging the arm toward the functional plane; and
    wherein the holder includes:
        a hooking portion engaged with the hook when the first functional unit is located at the operational position to restrict further pivoting of the first functional unit.

13. The structure according to claim 12, wherein the operational position of the first functional unit is one of a first operational position and a second operational position, wherein the arm has a button extending through the functional plane, and wherein the hook engages the hooking portion when the first functional unit is located at the first operational position, and by pushing the button against the urging force of the plate spring when the first functional unit is located at the first operational position, the hook is disengaged from the hooking portion to permit further pivoting of the first functional unit to the second operational position.

14. The structure according to claim 13, wherein the functional device of the first functional unit includes a plurality of switches, wherein the switches are grouped into a first switch group, which is exposed from the panel when the first functional unit is located at any one of the first operational position and the second operational position, and a second switch group, which is exposed from the panel only when the first functional unit is located at the second operational position.

15. The structure according to claim 14, wherein the first functional unit includes a lighting device for illuminating the switches.

16. The structure according to claim 15, wherein the second functional unit is an accommodating case for accommodating an object, and the functional plane of the accommodating case is opened to permit insertion and removal of the object through the functional plane.

17. The structure according to claim 16, wherein the panel includes an instrument panel.

18. A structure for holding a functional device in a passenger compartment of a vehicle, the structure comprising:

a switchboard arranged on a panel in the passenger compartment, wherein the switchboard includes a functional device;

an accommodating case arranged adjacent to the switchboard;

a holder for holding the switchboard and the accommodating case in the panel;

a common shaft shared by the switchboard and the accommodating case and pivotally supporting the switchboard and the accommodating case, wherein the switchboard and the accommodating case are each pivoted about the common shaft between a retracted position and an operational position, the switchboard and the accommodating case each being accommodated in the panel when located at the retracted position and being exposed from the panel when located at the operational position, wherein the switchboard remains at the retracted position when the accommodating case is located at the operational position;

a first spring connecting the switchboard and the accommodating case to each other and urging the accommodating case toward the operational position, wherein the first spring pivots the accommodating case integrally with the switchboard when the switchboard is pivoted between the retracted position and the operational position;

a second spring for connecting the switchboard and the holder to each other and urging the switchboard toward the operational position;

a lever connected to the switchboard and having an engaging pin;

a cam pivotally supported on the holder and having a guide groove that engages the engaging pin;

a third spring for urging the cam in a predetermined direction to arrange the switchboard at the operational position, wherein the third spring engages the engaging pin with the guide groove to hold the switchboard at the retracted position, and wherein, when the lever is moved against the urging force of the third spring, the engaging pin is disengaged from the guide groove and the urging force of the second spring moves the switchboard to the operational position; and a restriction pin arranged on the accommodating case, wherein the restriction pin contacts the cam and restricts the disengagement of the engaging pin from the guide groove of the cam when the accommodating case is located at the operational position.

19. The structure according to claim 18, wherein the switchboard includes:

an arm arranged under the functional device;

an arm shaft pivotally supporting the arm;

a hook arranged on the arm; and a plate spring for urging the arm toward the functional device; and wherein the holder includes:

a hooking portion engaged with the hook when the switchboard is located at the operational position to restrict further pivoting of the switchboard.

20. The structure according to claim 19, wherein the operational position of the switchboard is one of a first operational position and a second operational position, wherein the arm has a button, and wherein the hook engages the hooking portion when the switchboard is located at the first operational position, and by pushing the button against the urging force of the plate spring when the switchboard is located at the first operational position, the hook is disengaged from the hooking portion to permit further pivoting of the switchboard to the second operational position.

21. The structure according to claim 20, wherein the functional device of the switchboard includes a plurality of switches, wherein the switches are grouped into a first switch group, which is exposed from the panel when the switchboard is located at any one of the first operational position and the second operational position, and a second switch group, which is exposed from the panel only when the switchboard is located at the second operational position.

* * * * *